United States Patent
Satomura

(10) Patent No.: US 11,074,818 B2
(45) Date of Patent: Jul. 27, 2021

(54) DRIVE ASSIST DEVICE AND DRIVE ASSIST METHOD

(71) Applicant: DENSO CORPORATION, Kariya (JP)

(72) Inventor: Shota Satomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 67 days.

(21) Appl. No.: 16/337,307

(22) PCT Filed: Sep. 6, 2017

(86) PCT No.: PCT/JP2017/032125
§ 371 (c)(1),
(2) Date: Mar. 27, 2019

(87) PCT Pub. No.: WO2018/061682
PCT Pub. Date: Apr. 5, 2018

(65) Prior Publication Data
US 2020/0035102 A1    Jan. 30, 2020

(30) Foreign Application Priority Data
Sep. 30, 2016 (JP) .............................. JP2016-194599

(51) Int. Cl.
*G08G 1/16* (2006.01)
*G06K 9/00* (2006.01)
*B60W 50/14* (2020.01)

(52) U.S. Cl.
CPC ......... *G08G 1/166* (2013.01); *G06K 9/00805* (2013.01); *G08G 1/167* (2013.01); *B60W 50/14* (2013.01); *B60W 2554/00* (2020.02)

(58) Field of Classification Search
CPC .... G08G 1/166; G08G 1/167; G08G 1/09623; G06K 9/00805; G06K 9/00818;
(Continued)

(56) References Cited

U.S. PATENT DOCUMENTS 5,289,181 A * 2/1994 Watanabe ............ G08G 1/0965
340/436
2007/0225933 A1 9/2007 Shimomura
(Continued)

FOREIGN PATENT DOCUMENTS

JP 2002-312797 10/2002
JP 2005-182308 A 7/2005
(Continued)

*Primary Examiner* — Jerome Grant, II
(74) *Attorney, Agent, or Firm* — Maschoff Brennan

(57) ABSTRACT

A drive assist device includes: an acquisition unit that acquires a captured image from an on-board camera; a recognition unit that recognizes road information of roads around a host vehicle on the basis of the captured image; a determination unit that determines, on the basis of the road information recognized by the recognition unit, a priority relation between a present road in which the host vehicle is running and an intersecting road that meets the present road; and an assist unit that executes, in response to the determination unit determining that the present road does not have priority over the intersecting road, drive assistance for the host vehicle when the host vehicle enters a place where the present road meets the intersecting road.

25 Claims, 8 Drawing Sheets

(58) Field of Classification Search
CPC .......... G06K 9/00798; B60W 2554/00; B60W 50/14; B60W 2555/60; B60W 2552/53; B60W 30/18154; B60W 2420/42; B60R 21/00
USPC .......................................................... 382/104
See application file for complete search history.

(56) References Cited

U.S. PATENT DOCUMENTS

| | | | |
|---|---|---|---|
| 2009/0326751 A1* | 12/2009 | Otake | B60T 7/22 701/25 |
| 2015/0302747 A1* | 10/2015 | Ro | G08G 1/0967 340/905 |
| 2017/0018177 A1* | 1/2017 | Kurotobi | G08G 1/161 |
| 2019/0025833 A1* | 1/2019 | Kim | G05D 1/0094 |
| 2019/0026918 A1* | 1/2019 | Gomezcaballero | G06T 1/00 |
| 2019/0164430 A1* | 5/2019 | Nix | B60R 1/002 |
| 2019/0221116 A1* | 7/2019 | Powch | G08G 1/0112 |
| 2019/0286147 A1* | 9/2019 | Matsunaga | B60W 60/0015 |
| 2019/0311617 A1* | 10/2019 | Karaoguz | G05D 1/0276 |
| 2020/0073381 A1* | 3/2020 | Wang | G05D 1/0285 |
| 2020/0193813 A1* | 6/2020 | Sui | G05D 1/0276 |
| 2020/0255027 A1* | 8/2020 | Kulkarni | G01C 21/3691 |

FOREIGN PATENT DOCUMENTS

| | | |
|---|---|---|
| JP | 2007-255977 A | 10/2007 |
| JP | 2009-075668 A | 4/2009 |
| JP | 2011-145892 A | 7/2011 |
| JP | 2013-105201 A | 5/2013 |

\* cited by examiner

DRIVE ASSIST DEVICE AND DRIVE ASSIST METHOD

CROSS-REFERENCE TO RELATED APPLICATION

The present application is a national stage application of PCT Application No. PCT/JP2017/032125, filed on Sep. 6, 2017, which claims priority to Japanese Patent Application No. 2016-194599 filed on Sep. 30, 2016, the contents of which are incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to a drive assist device and a drive assist method.

BACKGROUND ART

Drive assist devices for executing drive assistance have been proposed so far (for example, refer to PTL 1). This drive assist device communicates with a communication device installed on a road surface to acquire the position of a vehicle running on a non-priority road and the position of a vehicle running on a priority road, and determines the probability of collision on the basis of the relation between these positions. The drive assist device then provides notification in accordance with the probability of collision to effectively prevent a collision at the intersection.

CITATION LIST

Patent Literature

[PTL 1] JP 2009-75668 A

SUMMARY OF THE INVENTION

However, the drive assist device operates on the premise of communicating with a communication device installed on a road surface, and thus cannot be utilized on roads without communication devices. Nevertheless, it is difficult to install communication devices on all roads. In some road conditions, therefore, the drive assist device fails to provide appropriate assistance.

The present disclosure has been made in view of the above circumstances, and the main object thereof is to provide a drive assist device and a drive assist method for executing appropriate assistance in accordance with road conditions.

The present disclosure has employed the following means in order to solve the above problem.

The present disclosure includes: an acquisition unit that acquires a captured image from an on-board camera; a recognition unit that recognizes road information of roads around a host vehicle on the basis of the captured image; a determination unit that determines, on the basis of the road information recognized by the recognition unit, a priority relation between a present road in which the host vehicle is running and an intersecting road that meets the present road; and an assist unit that executes, in response to the determination unit determining that the present road does not have priority over the intersecting road, drive assistance for the host vehicle when the host vehicle enters a place where the present road meets the intersecting road.

Since road information is recognized on the basis of a captured image from the on-board camera, equipment such as communication devices need not be installed on the road side. Information on road conditions can be more effectively obtained from a captured image provided by the on-board camera than from information provided by a communication device or the like installed on the road side. Therefore, drive assistance for the host vehicle can be provided as appropriate according to road conditions when the host vehicle enters the place where the present road meets the intersecting road.

BRIEF DESCRIPTION OF DRAWINGS

The above and other objects, characteristics, and advantages of the present disclosure will be further clarified in the following detailed description with reference to the accompanying drawings, in which.

DESCRIPTION OF EMBODIMENTS

Figure 1:
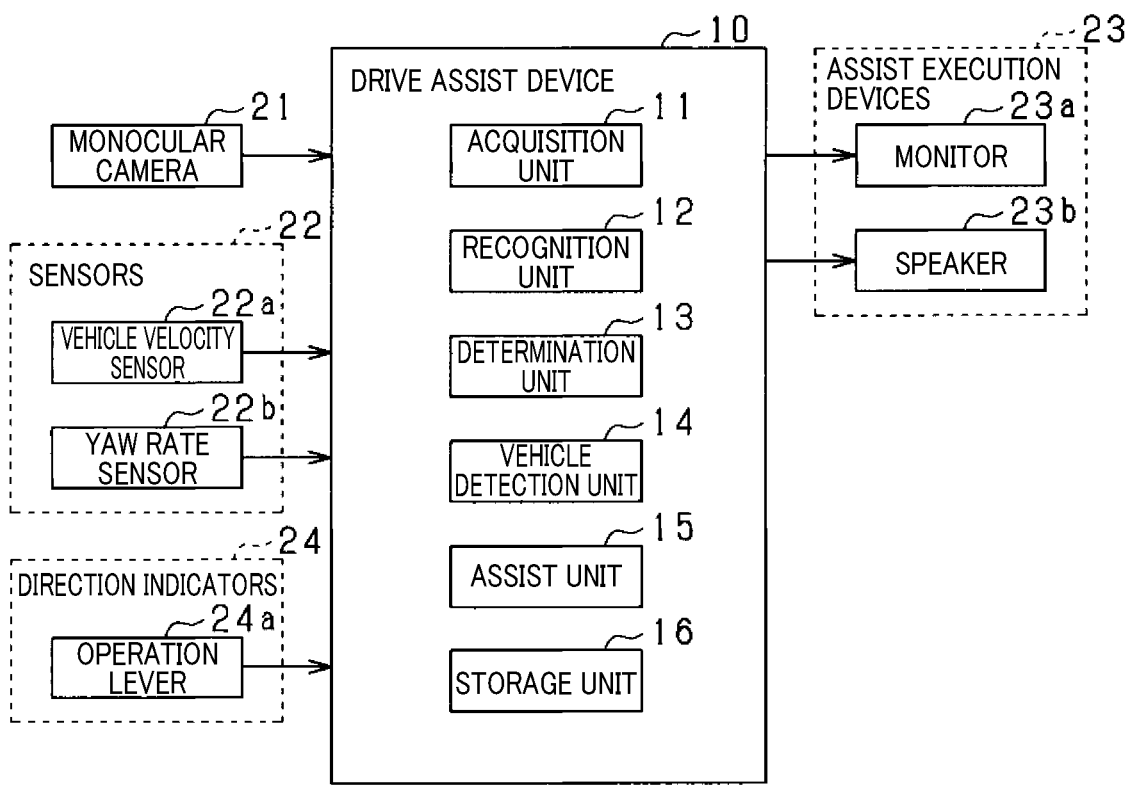
FIG. 1 is a block diagram illustrating a schematic configuration of a drive assist device.

Hereinafter, embodiments of the present disclosure will be described on the basis of the drawings. Note that identical or equivalent components in the following embodiments are denoted by the same reference signs in the drawings.

First Embodiment

A drive assist device and a drive assist method according to the first embodiment will be described with reference to the drawings. The drive assist device 10 is installed in a vehicle and provides drive assistance for the vehicle. Note that example roads in the present embodiment are right-hand traffic.

As illustrated in FIG. 1, the drive assist device 10 is communicably connected to a monocular camera 21 that is an on-board camera. The monocular camera 21 includes an imaging device such as CCD and COMS. The monocular camera 21 is arranged near the upper side of the windshield of the vehicle to capture (take an image of) the surrounding environment including the road in front of the host vehicle.

Captured images are output from the monocular camera 21 to the drive assist device 10. Note that a plurality of cameras (compound-eye camera) may be provided instead of the monocular camera 21.

The drive assist device 10 is a computer including a CPU, a ROM, a RAM, an input/output interface, and the like. The drive assist device 10 executes various functions using an acquisition unit 11, a recognition unit 12, a determination unit 13, a vehicle detection unit 14, and an assist unit 15. The acquisition unit 11 acquires a captured image. The recognition unit 12 recognizes road information of roads. The determination unit 13 determines the priority relation between roads. The vehicle detection unit 14 detects a vehicle. The assist unit 15 executes drive assistance. Programs stored in a storage unit 16 of the drive assist device 10 are executed, whereby various functions are implemented. Note that various functions may be implemented using an electronic circuit that is hardware. Alternatively, some of the functions may be implemented using software, i.e., processes to be executed on the computer.

The acquisition unit 11 acquires a captured image from the monocular camera 21. The acquisition unit 11 acquires captured images at predetermined intervals.

The recognition unit 12 recognizes road information of roads around the host vehicle on the basis of a captured image acquired by the acquisition unit 11. Specifically, the recognition unit 12 recognizes the type of road sign as road information included in a captured image through pattern matching using road sign patterns stored in advance in the storage unit 16, for example.

Figure 2:
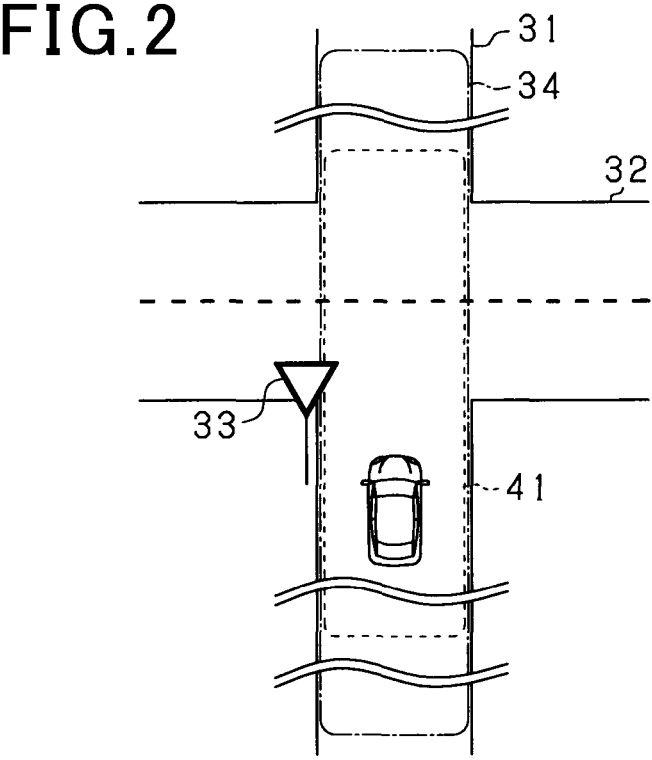
FIG. 2 is a diagram schematically illustrating a road area in which assistance is provided.
Figure 3:
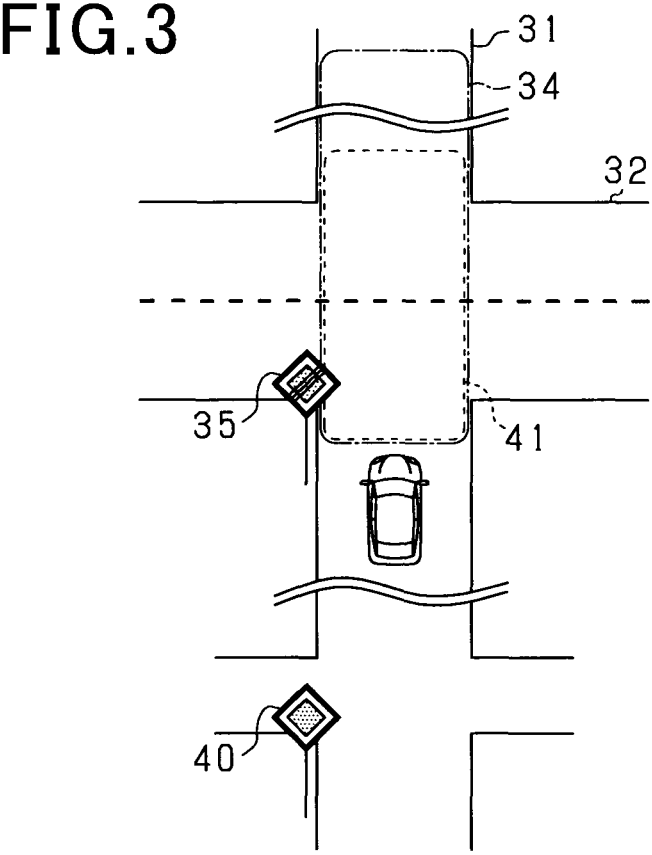
FIG. 3 is a diagram schematically illustrating a road area in which assistance is provided.
Figure 4:
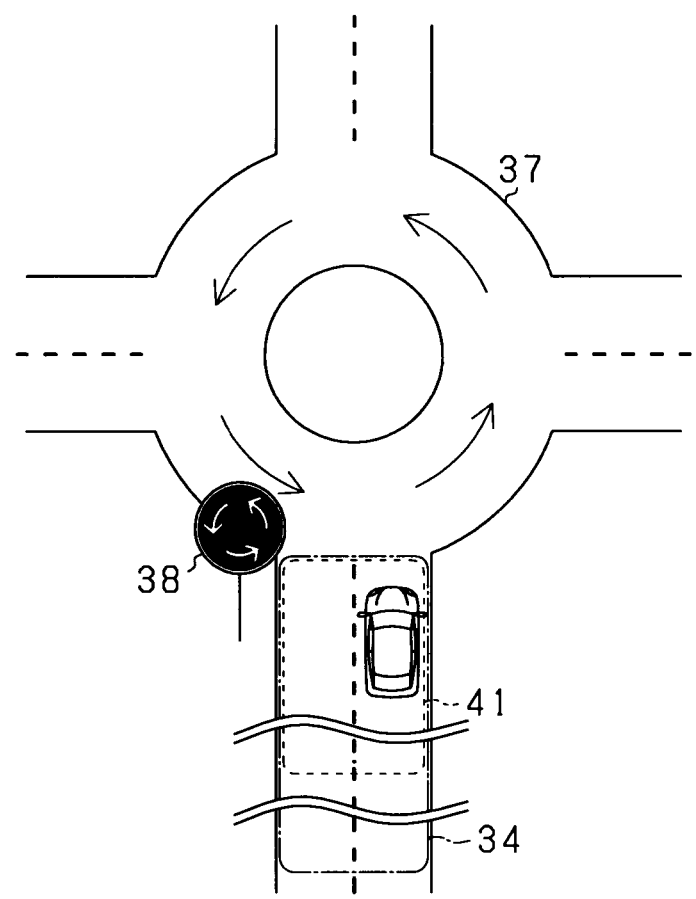
FIG. 4 is a diagram schematically illustrating a road area in which assistance is provided.

For example, road signs are indication boards installed at the side of roads to provide necessary information to drivers and the like. Road signs indicate directions, warnings, regulations, instructions, and the like. Examples of road signs include a road sign (yield sign 33) indicating that an intersecting road 32 that meets a present road 31 has priority (the present road 31 does not have priority) as illustrated in FIG. 2 and a road sign (priority end sign 35) indicating that the present road 31 no longer has priority as illustrated in FIG. 3. Other examples of road signs include a road sign (priority road sign 40) indicating that the present road 31 in which the host vehicle is running has priority as illustrated in FIG. 3 and a road sign 38 indicating a roundabout 37 as illustrated in FIG. 4. Road sign types vary from region to region. An intersecting road that meets the present road is, for example, a road that intersects, joins, or branches off from the present road.

The recognition unit 12 also recognizes a road form as road information included in a captured image. A road form is information that relates to an area in the present road and an area in an intersecting road that meets the present road and enables the identification of the shape, size (width), orientation, and position of the roads, for example. A road form enables, for example, the recognition of the width of the present road, the presence or absence of an intersecting road that meets the present road, the width of the intersecting road, and the shape and size of the place where the present road meets the intersecting road. In order to recognize a road form from a captured image, the recognition unit 12 extracts edge points of dividing parts, e.g., white lines, which define the road, and recognizes the road form on the basis of the extracted edge points. The road information recognized by the recognition unit 12 is stored in the storage unit 16.

The determination unit 13 determines the priority relation between the present road in which the host vehicle is running and an intersecting road that meets the present road on the basis of the road information recognized by the recognition unit 12. Specifically, the determination unit 13 determines whether there is a road sign indicating that the present road does not have priority over the intersecting road. If there is a road sign indicating that the present road does not have priority over the intersecting road, the determination unit 13 determines that the present road does not have priority within the road area set in accordance with the type of road sign.

Suppose, for example, a road sign indicating that the present road 31 does not have priority is a road sign (hereinafter referred to as the yield sign 33) indicating that the intersecting road 32 that meets the present road 31 is a priority road as illustrated in FIG. 2. In the presence of the yield sign 33, the determination unit 13 identifies a predetermined road area 34 relative to the yield sign 33 as a non-priority area. Specifically, the road area extending from 50 m before the yield sign 33 to 50 m ahead of the yield sign 33 along the present road 31 is designated as the non-priority road area 34. In FIG. 2, the non-priority road area 34 is indicated by the dashed-dotted line. Note that the place where the present road 31 meets the intersecting road 32 is also identified as a non-priority place as long as it is within the road area 34 extending from 50 m before the yield sign 33 to 50 m ahead of the yield sign 33.

Suppose, for example, a road sign indicating that the present road 31 does not have priority is a road sign (hereinafter referred to as the priority end sign 35) indicating that the present road 31 is no longer a priority road as illustrated in FIG. 3. In the presence of the priority end sign 35, the determination unit 13 identifies a predetermined road area 34 relative to the priority end sign 35 as a non-priority area. Specifically, the determination unit 13 designates the road area extending 500 m ahead of the priority end sign 35 along the present road 31 as the non-priority road area 34. In FIG. 3, the non-priority road area 34 is indicated by the dashed-dotted line. Note that the place where the present road 31 meets the intersecting road 32 is also identified as a non-priority place as long as it is within the road area 34 extending 500 m ahead of the priority end sign along the present road 31.

Suppose, for example, a road sign indicating that the present road 31 does not have priority is the road sign 38 indicating the roundabout 37 as illustrated in FIG. 4. In the roundabout 37, vehicles traveling in the roundabout 37 are given priority over vehicles that are about to enter the roundabout 37. In the presence of the road sign 38 indicating the roundabout 37, therefore, roads that join the roundabout 37 do not have priority. Thus, in the presence of the road sign 38 indicating the roundabout 37, the determination unit 13 identifies a predetermined road area 34 relative to the road sign 38 indicating the roundabout 37 as a non-priority area. Specifically, in the presence of the road sign 38 indicating the roundabout 37, the determination unit 13 designates, as the non-priority road area 34, the road area in the present road 31 extending from 20 m before the roundabout 37 to the entrance to the roundabout 37. In FIG. 4, the non-priority road area 34 is indicated by the dashed-dotted line. The roundabout 37 is included in the intersecting road that meets the present road 31.

Note that the non-priority road area 34 may be freely changed. For example, in the presence of a priority end sign, the part of the present road extending from the priority end sign to the entrance to the place where the present road meets the intersecting road may be designated as the non-priority area. In the presence of a yield sign, the road area extending from 60 m before the yield sign to the place where the present road meets the intersecting road may be designated as the non-priority area.

The vehicle detection unit 14 detects a running vehicle in the intersecting road. In the present embodiment, the vehicle detection unit 14 detects a running vehicle in the intersecting road on the basis of captured images acquired by the acquisition unit 11. For example, the vehicle detection unit 14 compares the position of a vehicle in the previous captured image with the position of the vehicle in the latest captured image to detect the presence or absence of a running vehicle running in the intersecting road, the position of the running vehicle, and the traveling direction of the running vehicle. Specifically, if the result of comparison shows that the position of the vehicle has moved, the vehicle detection unit 14 detects the presence of the running vehicle. The vehicle detection unit 14 also detects in which lane the running vehicle is traveling in consideration of the positional relation between lanes and the running vehicle. The vehicle detection unit 14 also detects the traveling direction of the running vehicle using the movement direction. Note that the vehicle detection unit 14 may detect a running vehicle in the intersecting road using the position or orientation of the vehicle in the intersecting road.

In response to the determination unit 13 determining that the present road does not have priority over the intersecting road, the assist unit 15 executes drive assistance for the host vehicle when the host vehicle enters the place where the present road meets the intersecting road.

The drive assist device 10 is connected to sensors 22 provided in the vehicle. For drive assistance, the assist unit 15 utilizes information about the host vehicle based on detection signals from the sensors 22. The sensors 22 include, for example, a vehicle velocity sensor 22a that detects the velocity of the host vehicle and a yaw rate sensor 22b that detects the angular velocity (yaw rate) of the host vehicle in the turning direction.

The drive assist device 10 is also connected to assist execution devices 23 provided in the vehicle. The assist unit 15 controls the assist execution devices 23 to execute drive assistance. The assist execution devices 23 include, for example, a monitor 23a that serves as a display device that displays characters or figures and a speaker 23b that outputs alarms or voice guidance. Note that the assist execution devices 23 may include devices that control the operation of the vehicle, such as the brake and the accelerator. In other words, the assist unit 15 is configured to be capable of executing assistance using a plurality of assist execution devices 23. The monitor 23a and the speaker 23b are configured to be capable of executing assistance in different ways.

The vehicle is also equipped with direction indicators 24 that show others the intended traveling direction of the vehicle. The direction indicators 24 are connected to an operation lever 24a with which the vehicle's driver indicates his/her intention to turn right or left. The operation lever 24a is moved by the driver to the left indication position, the middle position, or the right indication position, and outputs a turn signal to the drive assist device 10 as operation information corresponding to the selected position. For drive assistance, the assist unit 15 utilizes operation information based on the input turn signal.

Road conditions vary from road to road. It is therefore desirable that drive assistance be provided by utilizing road signs or the like which appear to be widely used on roads. Especially in a case where the present road does not have priority over an intersecting road, it is desirable that drive assistance be provided when the host vehicle enters the intersecting road. In this regard, the drive assist device 10 according to the present embodiment determines the priority relation on the basis of the road information recognized from a captured image, and executes drive assistance when the host vehicle enters the intersecting road if the present road does not have priority. Below is a description of various processes for drive assistance.

Figure 5:
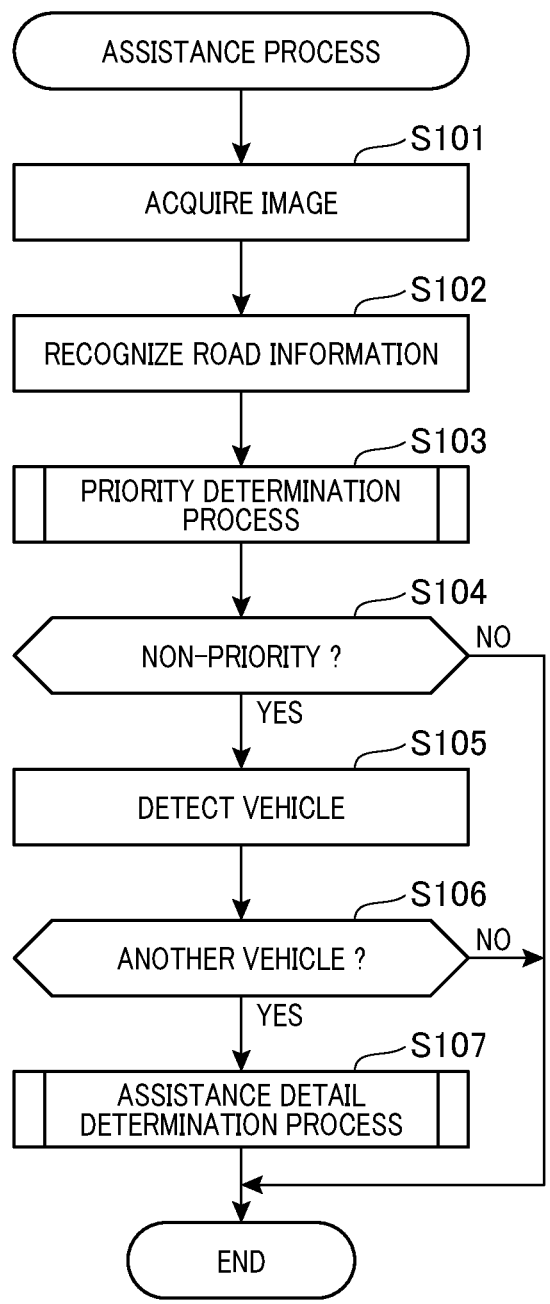
FIG. 5 is a flowchart illustrating an assistance start-up process.

First, an assistance start-up process for starting drive assistance will be described with reference to FIG. 5. The assistance start-up process is executed by the drive assist device 10 at predetermined intervals except during drive assistance.

Once the assistance start-up process is executed, the drive assist device 10 acquires a captured image from the monocular camera 21 (step S101). The drive assist device 10 recognizes road information of roads around the host vehicle on the basis of the acquired captured image (step S102). In step S102, the drive assist device 10 recognizes the presence or absence of a road sign, the type of road sign, and the road form.

Next, the drive assist device 10 executes a priority determination process for determining the priority relation between the present road and an intersecting road that meets the present road (step S103). The priority determination process will be described later.

The drive assist device 10 determines whether the present road does not have priority over the intersecting road (step S104). In response to determining that the present road has priority (step S104: NO), the drive assist device 10 finishes the assistance start-up process. If the present road is identified as a priority road, drive assistance for the host vehicle that is about to enter the place where the present road meets a priority intersecting road (hereinafter also simply referred to as non-priority drive assistance) is not provided. This prevents the driver from being distracted by excessive assistance. Note that another type of drive assistance may be provided after the present road is identified as a priority road. For example, drive assistance may be provided to warn the driver that the host vehicle is approaching another running vehicle.

In contrast, in response to determining that the present road does not have priority (step S104: YES), the drive assist device 10 detects a running vehicle in the intersecting road (step S105). In step S105, the drive assist device 10 detects the presence or absence of a running vehicle in the intersecting road, the position of the running vehicle, and the traveling direction of the running vehicle on the basis of captured images.

The drive assist device 10 then determines whether there is a running vehicle on the intersecting road (step S106). In response to determining that there is no running vehicle in the intersecting road (step S106: NO), the drive assist device 10 finishes the assistance start-up process. Non-priority drive assistance is not provided in the absence of a running vehicle, which prevents the driver from being bothered by excessive assistance. Although non-priority drive assistance is not provided in the absence of another running vehicle, another type of drive assistance may be provided. For example, if the velocity of the host vehicle is higher than a predetermined velocity, drive assistance may be provided to warn the driver or to reduce the velocity of the vehicle.

In response to determining that there is a running vehicle in the intersecting road (step S106: YES), the drive assist device 10 determines to execute drive assistance when the host vehicle enters the priority intersecting road, and executes an assistance detail determination process for determining the details of assistance (step S107). The assistance detail determination process will be described later. The assistance start-up process is thus finished.

Figure 6:
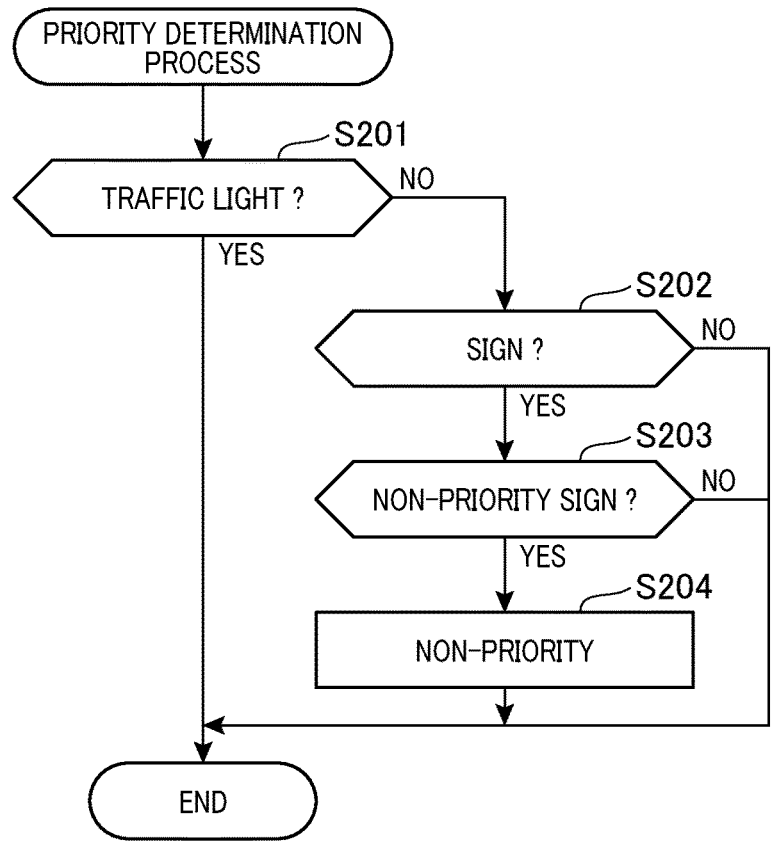
FIG. 6 is a flowchart illustrating a priority determination process.

Next, the priority determination process in step S103 will be described with reference to FIG. 6. The drive assist device 10 determines whether there is a traffic light at the place where the present road meets the intersecting road on the basis of the acquired captured image (step S201). The drive assist device 10 recognizes whether a traffic light is included in the acquired captured image through pattern matching using traffic light patterns stored in advance in the storage unit 16, for example. Traffic lights are devices installed on roads to indicate whether vehicles are allowed to proceed. Thus, the drive assist device 10 functions as a traffic light determination unit that determines whether there is a traffic light.

If a traffic light is included (step S201: YES), the drive assist device 10 finishes the priority determination process. A traffic light enables the driver to drive in accordance with the indication by the traffic light, and vehicles in the intersecting road are similarly driven in accordance with the indication by the traffic light on the intersecting road. Therefore, non-priority drive assistance is restricted. In the present embodiment, non-priority drive assistance is not executed. Non-priority drive assistance is not provided in the presence of a traffic light, which prevents the driver from being bothered by excessive assistance. Although non-priority drive assistance is not provided in the presence of a traffic light, another type of drive assistance may be provided. For example, drive assistance may be provided to reduce the velocity of the vehicle in accordance with the indication by the traffic light. Alternatively, non-priority drive assistance may be partially executed in the presence of a traffic light.

In contrast, if no traffic light is included (step S201: NO), the drive assist device 10 determines whether at least one road sign is included in the captured image (step S202). If no road sign is included (step S202: NO), the drive assist device 10 finishes the priority determination process. In contrast, if at least one road sign is included (step S202: YES), the drive assist device 10 determines whether there is a road sign indicating that the present road does not have priority over the intersecting road on the basis of the type of road sign included in the road information (step S203).

If there is no road sign indicating that the present road does not have priority over the intersecting road (step S203: NO), the drive assist device 10 finishes the priority determination process. In contrast, if there is a road sign indicating that the present road does not have priority over the intersecting road (step S203: YES), the drive assist device 10 stores, in the storage unit 16, information indicating that the present road does not have priority over the intersecting road (step S204). If the information indicating that the present road does not have priority is retained, the drive assist device 10 determines in step S104 that the present road does not have priority. The information indicating that the present road does not have priority is retained as long as the host vehicle is within the non-priority road area, and erased after the host vehicle leaves the road area. For example, the information is erased after the host vehicle enters the intersecting road or after the host vehicle passes by a road sign (priority road sign) indicating that the present road in which the host vehicle is traveling has priority. The non-priority road area is set in accordance with the type of road sign.

As described above, by executing the priority determination process, in the absence of a traffic light and in the presence of a road sign indicating that the present road does not have priority, the drive assist device 10 determines that the present road does not have priority within the road area set in accordance with the type of road sign.

Road areas at high risk of vehicle collision vary according to road conditions. For example, road areas at high risk of vehicle collision differ between an intersection where the present road intersects an intersecting road at right angles and a roundabout. Specifically, the road area within an intersection where the present road intersects an intersecting road at right angles has different flows of traffic and thus has a higher risk of vehicle collision than the road area within a roundabout. In addition, road areas at high risk of vehicle collision differ between an intersection where the present road intersects a wide intersecting road at right angles and an intersection where the present road intersects a narrow intersecting road at right angles. Specifically, the road area at high risk of vehicle collision within an intersection of the present road and a wide intersecting road is broader than that within an intersection of the present road and a narrow intersecting road.

Moreover, road areas at high risk of collision vary according to vehicle conditions. For example, in a situation where the host vehicle is about to enter a lane of an intersecting road, road areas at high risk of collision vary depending on whether there is a running vehicle in the lane approaching the host vehicle.

In view of the foregoing, in the assistance detail determination process of step S107, the drive assist device 10 determines, on the basis of the road information and vehicle conditions, the assist area in which assistance should be executed. Below is a description of the assistance detail determination process in step S107.

Figure 7:
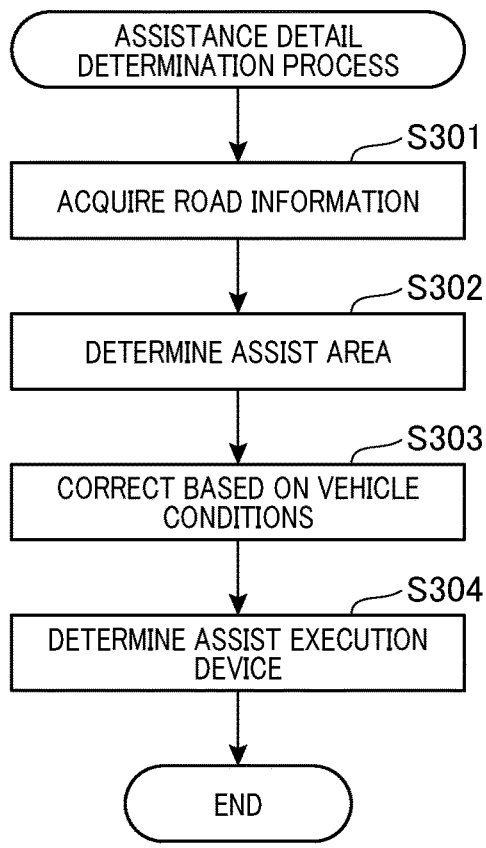
FIG. 7 is a flowchart illustrating an assistance detail determination process.

As illustrated in FIG. 7, the drive assist device 10 acquires, from the storage unit 16, the road form and the type of road sign included in the road information recognized on the basis of the captured image (step S301). The road form enables the identification of an area in the present road, an area in the intersecting road, and an area in the place where the present road meets the intersecting road.

Next, the drive assist device 10 determines the assist area in which assistance should be executed on the basis of the type of road sign and the road form included in the road information (step S302). For example, in a case where the type of road sign is the yield sign 33 as illustrated in FIG. 2, the drive assist device 10 identifies, on the basis of the road form, the place where the present road 31 meets the intersecting road 32 and a road area in the present road 31 extending forward and backward from the place, and designates them as an assist area 41. Specifically, in the present road 31, the road area extending from 30 m before the entrance to the place where the present road 31 meets the intersecting road 32 to the place and the road area extending from the place where the present road 31 meets the intersecting road 32 to 1.5 m ahead of the place are designated as the assist area 41. In FIG. 2, the assist area 41 is indicated by the broken line.

Similarly, in a case where the type of road sign is the priority end sign 35 as illustrated in FIG. 3, the drive assist device 10 identifies, on the basis of the road form, the place where the present road 31 meets the intersecting road 32 and a road area in the present road 31 extending forward and backward from the place, and designates them as the assist area 41. In FIG. 3, the assist area 41 is indicated by the broken line.

In a case where the type of road sign is the road sign 38 indicating the roundabout 37 as illustrated in FIG. 4, the drive assist device 10 identifies, on the basis of the road form, a road area in the present road 31 extending to the entrance to the roundabout 37, and designates the road area as the assist area 41. Specifically, in the present road 31, the road area extending from 15 m before the entrance to the roundabout 37 to the entrance to the roundabout 37 is designated as the assist area 41. In other words, the area inside the roundabout 37 is not designated as the assist area. In FIG. 4, the assist area 41 is indicated by the broken line.

In practice, assist areas in which assistance is executed may be freely changed. For example, non-priority road areas may be designated as the assist areas. Alternatively, only the place where the present road meets an intersecting road may be designated as the assist area. Still alternatively, only the road area before the place where the present road meets an intersecting road may be designated as the assist area.

The drive assist device 10 then corrects the assist area determined in step S302 such that assistance is provided in an appropriate area on the basis of vehicle conditions (step S303). Specifically, in a situation where the host vehicle is about to turn right or left to enter a lane of the intersecting road, if a running vehicle approaching the host vehicle is detected in the lane, the drive assist device 10 makes corrections in a manner that makes the assist area different from the assist area to be used when there is no approaching vehicle detected. For example, in the lane, the drive assist device 10 makes corrections in a manner that expands the assist area 41 determined in step S302 along the entry direction of the host vehicle. Before the host vehicle enters the intersecting road, the entry direction of the host vehicle and whether the host vehicle is likely to enter a lane of the intersecting road can be determined on the basis of a turn signal. While the host vehicle is entering the intersecting road, the entry direction of the host vehicle and whether the host vehicle is likely to enter a lane of the intersecting road can be determined on the basis of a detection signal from the yaw rate sensor 22b.

Figure 8:
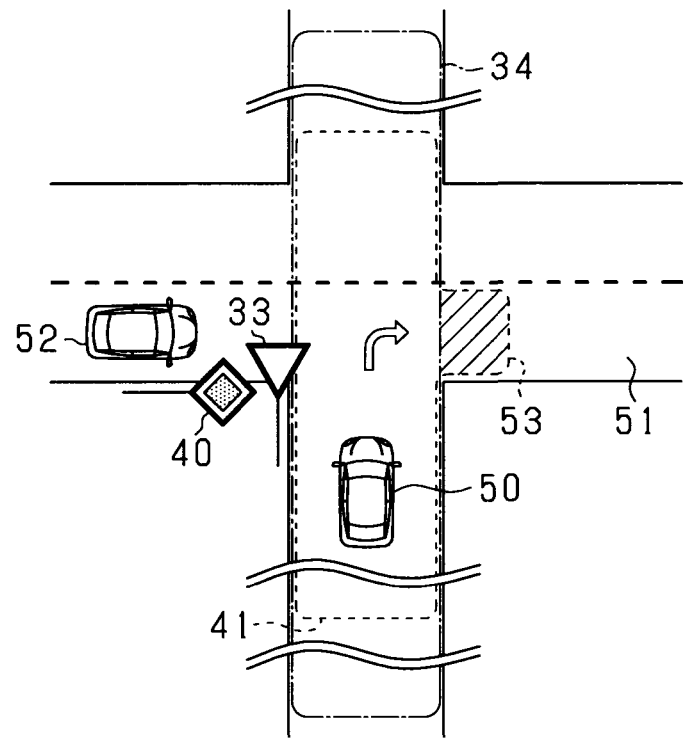
FIG. 8 is a diagram schematically illustrating a road area in which assistance is provided.

The procedure for corrections is described in more detail below with reference to FIGS. 8 and 9. FIG. 8 illustrates an intersection where the present road intersects an intersecting road at right angles. A host vehicle 50 is about to turn right to enter a lane 51 of the intersecting road, and a running vehicle 52 in the lane 51 is approaching the host vehicle 50. Since FIG. 8 includes the yield sign 33, the assist area 41 is determined in step S302 as illustrated in FIG. 2. Then, in step S303, the drive assist device 10 makes corrections in a manner that expands the assist area 41 in the lane 51 rightward along the traveling direction by 5 m. In FIG. 8, an expanded assist area 53 is indicated by the oblique lines. The priority road area 34 is indicated by the dashed-dotted line, and the assist area 41 is indicated by the broken line.

Figure 9:
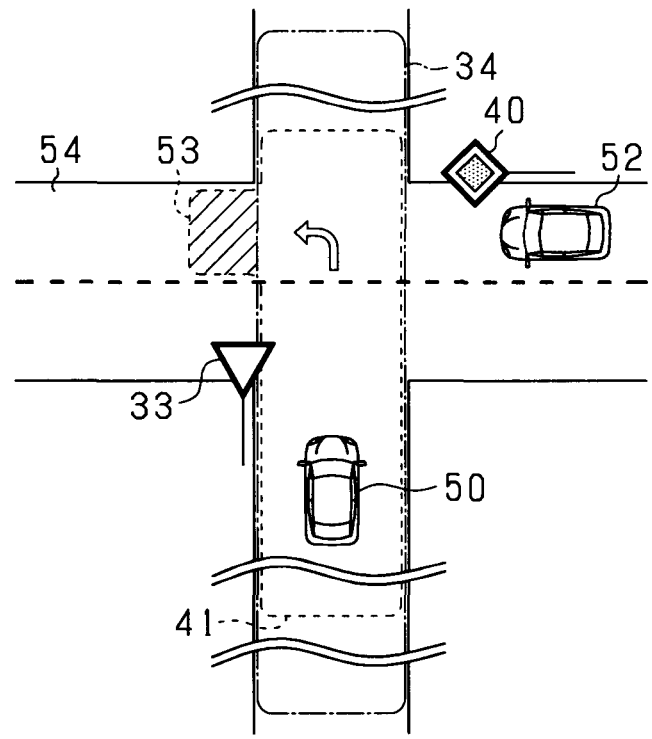
FIG. 9 is a diagram schematically illustrating a road area in which assistance is provided.

Similarly, FIG. 9 illustrates an intersection where the present road intersects an intersecting road at right angles. The host vehicle 50 is about to turn left to enter a lane 54 of the intersecting road, and the running vehicle 52 in the lane 54 is approaching the host vehicle 50. Since FIG. 9 also includes the yield sign 33, the assist area 41 is determined in step S302 as illustrated in FIG. 2. Then, in step S303, the drive assist device 10 makes corrections in a manner that expands the assist area 41 in the lane 54 leftward along the traveling direction by 5 m. In FIG. 9, the expanded assist area 53 is indicated by the oblique lines. The priority road area 34 is indicated by the dashed-dotted line, and the assist area 41 is indicated by the broken line.

In a situation where the host vehicle is about to cross a lane of the intersecting road, if a running vehicle is detected in the lane, the drive assist device 10 makes corrections in a manner that makes the assist area different from the assist area to be used when there is no running vehicle detected. For example, the assist area determined in step S302 is expanded in consideration of the probability that the running vehicle in the intersecting road will enter the present road. Specifically, the road area extending 30 m ahead of the place where the present road meets the intersecting road is added to the assist area.

The assist area for the host vehicle traveling at high velocity may be broader than the assist area for the host vehicle traveling at low velocity. Specifically, the assist area may extend from 50 m before the entrance to the place where the present road meets an intersecting road. The velocity of the host vehicle can be determined using a detection signal from the vehicle velocity sensor 22a.

The assist area need not necessarily be corrected on the basis of vehicle conditions. The assist area may be determined without identifying the road form. For example, candidates for the assist area may be stored in advance in association with road sign types, and the assist area may be determined in accordance with the recognized type of road sign. Specifically, in the presence of a yield sign, the area with a radius of 50 m around the yield sign may be designated as the assist area.

The drive assist device 10 then determines the type of assist execution device for use in executing assistance on the basis of the road information and vehicle conditions (step S304). In the present embodiment, the drive assist device 10 determines to use at least one of the monitor 23a and the speaker 23b on the basis of the road information and vehicle conditions. For example, if the type of road sign is a yield sign or a priority end sign and if there are a large number of (e.g., two or more) running vehicles in the intersecting road, the drive assist device 10 determines to use the monitor 23a and the speaker 23b. In contrast, if there are a small number of (e.g., one) running vehicles in the intersecting road, the drive assist device 10 determines to use the speaker 23b. Alternatively, for example, if the type of road sign is a road sign indicating a roundabout, the drive assist device 10 determines to use the monitor 23a.

Note that which type of assist execution device 23 is determined may be freely changed. The method of determining the type of assist execution device 23 may be freely changed. For example, the probability of collision may be determined on the basis of the road information and vehicle conditions, and the type of assist execution device 23 may be determined on the basis of the probability of collision.

In the assistance start-up process, after the present road is identified as a non-priority road and the details of assistance are determined, if the host vehicle is within the assist area, the drive assist device 10 controls the assist execution device 23 of the type determined in step S304 to execute drive assistance. Whether the host vehicle is within the assist area may be determined using the acquired captured image, or may be determined on the basis of detection signals from various sensors (the vehicle velocity sensor 22a and the yaw rate sensor 22b) or the result of measurement provided by a running distance measurement device or the like. Alternatively, whether the host vehicle is within the assist area may be determined on the basis of the positional information acquired from a navigation system. Still alternatively, these items may be combined and used for determination.

The drive assist device 10 controls the monitor 23a to execute assistance, for example, by displaying, on the monitor 23a, characters or figures for warning the driver that the present road does not have priority and that there is a running vehicle. The drive assist device 10 controls the speaker 23b to execute assistance, for example, by outputting, from the speaker 23b, alarms for warning the driver that the present road does not have priority and that there is a crossing vehicle.

Next, a specific procedure for executing drive assistance will be described with reference to FIG. 2. In response to recognizing the yield sign 33 on the basis of a captured image, the host vehicle sets the non-priority road area 34 and determines that the present road 31 does not have priority within the road area 34. In response to detecting a running vehicle in the intersecting road 32 that meets the present road 31 while determining that the present road 31 does not have priority, the drive assist device 10 determines the assist area 41 and the type of assist execution device 23 for use in assistance when the host vehicle enters the place where the present road 31 meets the intersecting road 32. If the host vehicle is within the assist area 41, the drive assist device 10 controls the assist execution device 23 to execute drive assistance until the host vehicle leaves the assist area 41.

According to the first embodiment described in detail above, the following advantageous effects can be obtained.

The drive assist device 10 recognizes road information on the basis of a captured image provided by the monocular camera 21. Since the drive assist device 10 recognizes road information from road signs or the like widely used on roads, specialized equipment such as communication devices need not be installed on the road side. Road signs provide information necessary for utilizing roads. Therefore, necessary assistance can be provided to the driver by executing assistance on the basis of the type of road sign.

Information on road conditions can be more effectively obtained from a captured image provided by the monocular camera 21 than from information provided by a communication device or the like installed on the road side. In other words, information such as the road form and the position of another vehicle can be obtained. Therefore, by determining the priority relation in accordance with the road information recognized on the basis of a captured image to execute drive assistance, appropriate assistance can be provided in accordance with road conditions.

Road areas at risk of vehicle collision vary according to road conditions. Therefore, the assist area is determined on the basis of road information. Specifically, the drive assist device 10 determines the assist area on the basis of the road form and the type of road sign. Thus, for example, if the width of the road increases, the road area in which assistance is provided can be expanded in accordance with the width of the road, whereby assistance can be executed in an appropriate area. In addition, assistance can be executed in an appropriate area in accordance with the type of road sign.

The probability of collision is higher in the presence than in the absence of a running vehicle in an intersecting road. Therefore, assistance is executed if a running vehicle is detected in an intersecting road. In a situation where the host vehicle is about to turn right or left to enter a lane of an intersecting road or where the host vehicle is about to cross a lane, the probability of collision is higher in the presence than in the absence of a running vehicle in the lane approaching the host vehicle. Therefore, the drive assist device 10 corrects the assist area determined in step S302 such that assistance is provided in an appropriate area on the basis of vehicle conditions. For example, when there is a running vehicle approaching the host vehicle detected in the lane, assistance is executed in a broader area than when there is no approaching vehicle detected. Consequently, even though the probability of vehicle collision varies according to the traveling direction of the host vehicle or the presence or absence of an approaching running vehicle, assistance can be executed as appropriate.

Captured images enable the recognition of the presence or absence of a running vehicle as well as road information. Therefore, the drive assist device 10 uses captured images to detect the presence or absence of a running vehicle in an intersecting road. This eliminates the need for a dedicated device for vehicle detection.

Areas in which the host vehicle requires assistance vary according to the traveling direction of the host vehicle. Therefore, the assist area is changed in accordance with the traveling direction of the host vehicle. Consequently, appropriate assistance can be executed. The probability of collision varies according to road conditions. Therefore, assistance is executed by the assist execution device 23 of the type that depends on road information. Consequently, appropriate assistance can be executed.

A traffic light enables the driver to drive in accordance with the indication by the traffic light, and vehicles in an intersecting road are similarly driven in accordance with the indication by the traffic light on the intersecting road. Therefore, non-priority drive assistance is restricted. This prevents unnecessary activation of assistance, and prevents the driver from being bothered by excessive assistance.

Second Embodiment

The drive assist device 10 according to the second embodiment is difference from that according to the first embodiment in the function of the determination unit 13, the priority determination process, and the assistance detail determination process.

Below is a description of the determination unit 13 according to the second embodiment. If the type of road sign is recognized, the determination unit 13 determines the priority relation on the basis of the recognized type as described in the first embodiment. In contrast, if no road sign is recognized but the road form is recognized, the determination unit 13 determines the priority relation on the basis of the road form. Specifically, if the determination unit 13 is unable to recognize a road sign, the determination unit 13 determines, on the basis of the road form, whether the place where the present road meets the intersecting road has a predetermined road form indicating that the intersecting road has priority over the present road.

Figure 12A:
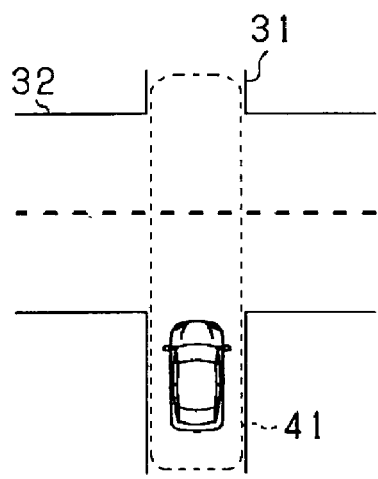
FIGS. 12A and 12B are diagrams schematically illustrating road areas in which assistance is provided.

For example, if the intersecting road 32 is wider than the present road 31 as illustrated in FIG. 12A, the determination unit 13 determines that the place where the present road 31 meets the intersecting road 32 has a predetermined road form indicating that the intersecting road 32 has priority over the present road 31, and determines that the present road 31 does not have priority. Note that "the intersecting road is wider than the present road" means, for example, that the intersecting road has twice as many lanes as the present road or that the intersecting road is twice as wide as the present road.

If the shape of the place where the present road meets the intersecting road is identical to the shape of a roundabout, the determination unit 13 determines that the place has a predetermined road form indicating that the intersecting road has priority over the present road, and determines that the present road does not have priority. Whether the shape of the place is identical to the shape of a roundabout is determined using a technique such as pattern matching. Note that a predetermined road form indicating that the intersecting road has priority over the present road may be freely changed.

Figure 10:
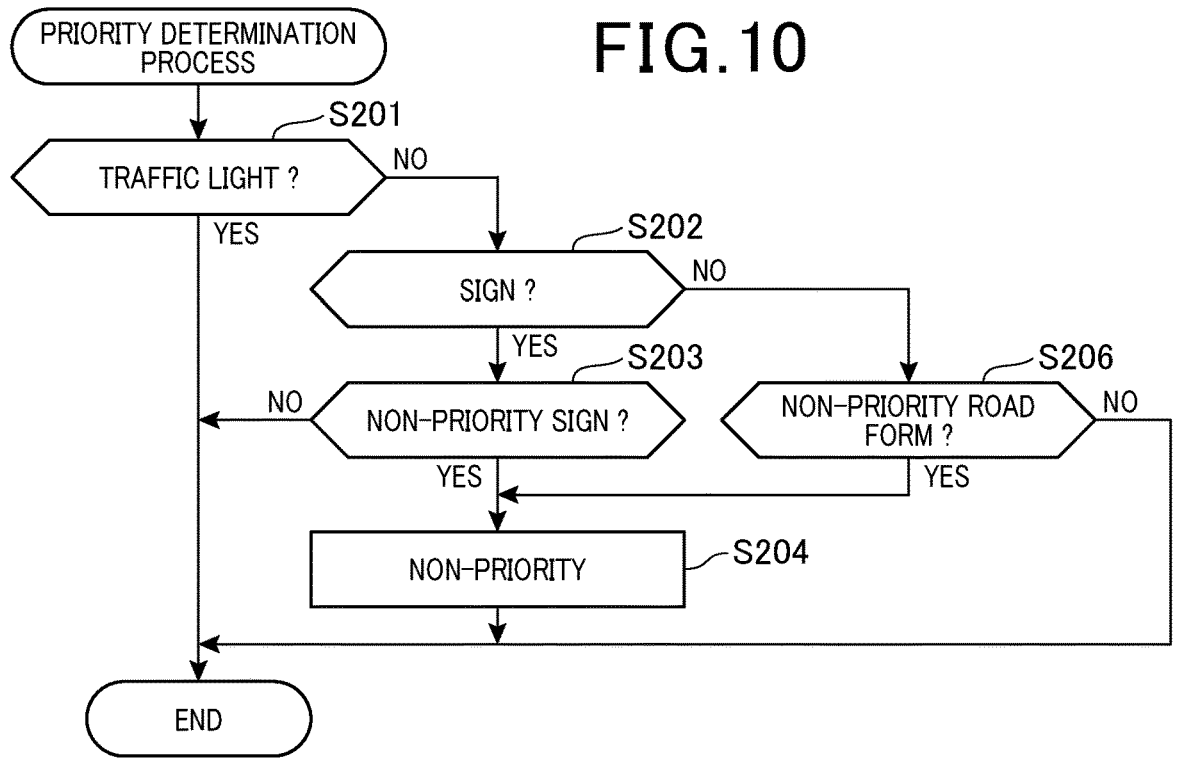
FIG. 10 is a flowchart illustrating a priority determination process according to the second embodiment.

Next, the priority determination process according to the second embodiment will be described with reference to FIG. 10. In response to determining in step S202 that no road sign is included in the captured image (step S202: NO), the drive assist device 10 determines whether the road form included in the road information indicates that the present road does not have priority over the intersecting road (step S206). If the road form does not indicate that the present road does not have priority over the intersecting road (step S206: NO), the drive assist device 10 finishes the priority determination process. In contrast, if the road form indicates that the present road does not have priority over the intersecting road (step S206: YES), the drive assist device 10 proceeds to step S204. In step S204, the drive assist device 10 stores, in the storage unit 16, information indicating that the present road does not have priority over the intersecting road. The information indicating that the present road does not have priority based on the road form is erased, for example, when the host vehicle enters the place where the present road meets the intersecting road.

As described above, by executing the priority determination process, if the type of road sign is recognized, the drive assist device 10 determines the priority relation on the basis of the type of road sign. Since the priority relation can be more easily determined from the type of road sign than from the road form, more appropriate assistance can be executed. In the absence of a road sign, however, if the road form indicates that the present road does not have priority over the intersecting road, the drive assist device 10 determines that the present road does not have priority. Consequently, appropriate assistance is provided in accordance with the road form even in a place without a road sign or the like.

Next, the assistance detail determination process will be described on the basis of FIG. 11.

Figure 11:
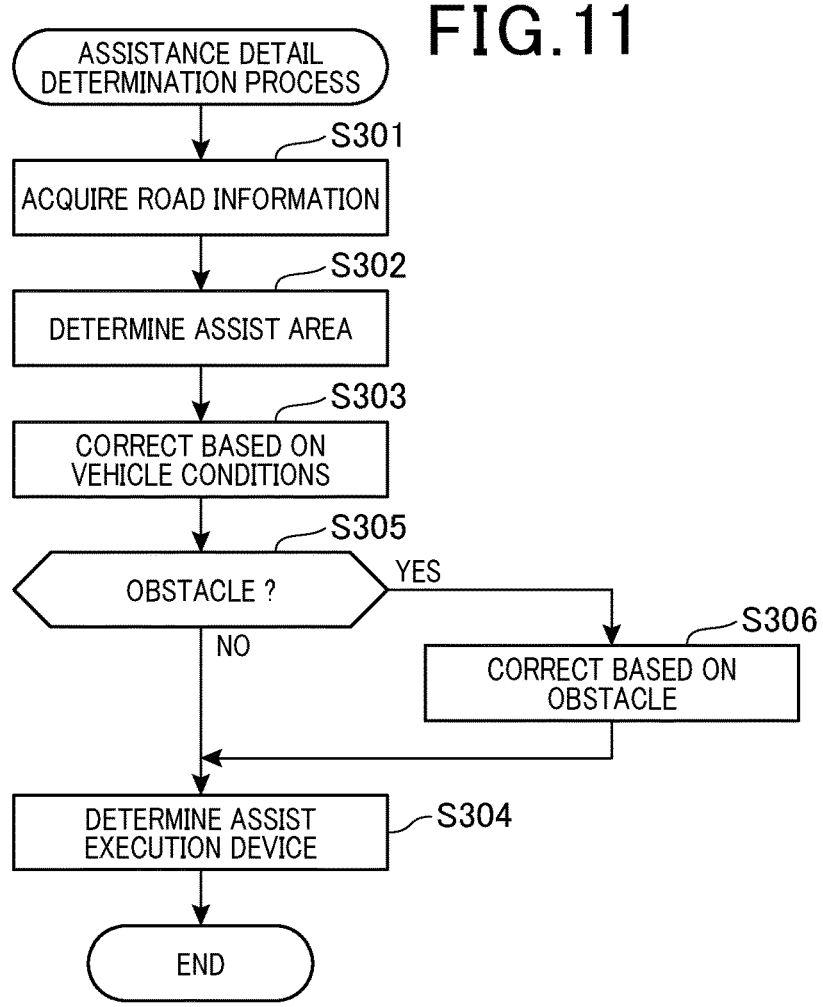
FIG. 11 is a flowchart illustrating an assistance detail determination process according to the second embodiment.

As illustrated in FIG. 11, in step S302, if the type of road sign is not included in the road information, the drive assist device 10 determines the assist area on the basis of the identified road form of the place where the present road meets the intersecting road. For example, if the intersecting road 32 is wider than the present road 31 as illustrated in FIG. 12A, the drive assist device 10 identifies the place where the present road 31 meets the intersecting road 32 and its surrounding road area, and designates them as the assist area 41. Specifically, in the present road 31, the road area extending from 30 m before the entrance to the place where the present road 31 meets the intersecting road 32 to the place and the road area extending from the place where the present road 31 meets the intersecting road 32 to 1.5 m ahead of the place are designated as the assist area 41. In a roundabout, the drive assist device 10 identifies a road area in the present road extending to the entrance to the roundabout. Specifically, in the present road, the road area extending from 15 m before the entrance to the roundabout to the entrance to the roundabout is designated as the assist area.

Road areas at high risk of vehicle collision vary according to road conditions. For example, road areas at high risk of vehicle collision vary depending on whether intersecting road conditions are unclear due to some obstacle or clear. Therefore, the drive assist device 10 corrects the assist area in the presence of an obstacle.

Specifically, after step S303, the drive assist device 10 determines whether there is an obstacle that hinders the capture of the intersecting road in the captured image (step S305). Typical examples of obstacles include architectural structures such as walls and buildings. Whether an obstacle hinders the capture of the intersecting road is determined on the basis of the location or size of the architectural structure. For example, if an architectural structure (e.g., house) with a predetermined size is located at a corner where the present road intersects an intersecting road at right angles and which is closer to the host vehicle than to the intersecting road, the drive assist device 10 determines that there is an obstacle that hinders the capture of the intersecting road. In the present embodiment, the drive assist device 10 functions as an obstacle detection unit that detects, from a captured image, the presence or absence of an obstacle that hinders the capture of the intersecting road.

If there is no obstacle (step S305: NO), the drive assist device 10 proceeds to step S304. In contrast, if there is an obstacle (step S305: YES), the drive assist device 10 corrects the assist area determined in step S302 such that assistance is provided in an appropriate area in consideration of the obstacle (step S306).

Figure 12B:
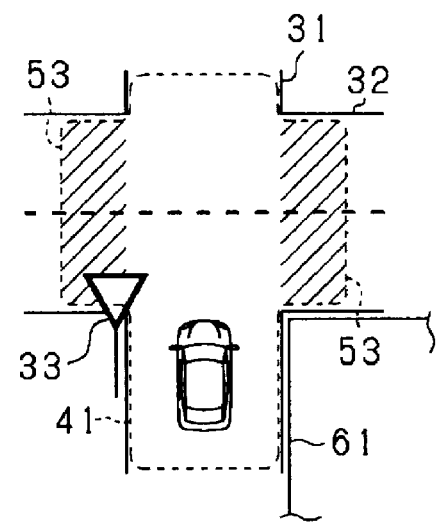

For example, the drive assist device 10 makes corrections in a manner that expands the assist area determined in step S302. Specifically, in the presence of an obstacle 61 as illustrated in FIG. 12B, corrections are made such that the assist area 41 covers the place where the present road 31 meets the intersecting road 32 and its surrounding road area (e.g., the road area extending 5 m from the place). In FIG. 12B, the expanded assist area 53 is indicated by the oblique lines. Consequently, appropriate assistance can be executed even when poor visibility caused by the obstacle 61 hinders the capture of the intersecting road 32 and makes it difficult to obtain road information of the intersecting road 32. After step S306, the drive assist device 10 executes step S304.

According to the second embodiment described in detail above, the following advantageous effects can be obtained in addition to the effects of the first embodiment.

Even when there is no road sign recognized, if the place where the present road meets an intersecting road has a road form indicating that the present road does not have priority over the intersecting road, the drive assist device 10 determines that the present road does not have priority. Consequently, the priority relation can be determined on the basis of the road form even in a place without a road sign or the like, and appropriate assistance can be provided.

If there is an obstacle that hinders the capture of the intersecting road in a captured image, the drive assist device 10 corrects the assist area to expand the assist area. Therefore, appropriate assistance can be executed even with poor visibility caused by the obstacle.

Other Embodiments

The present disclosure is not limited to the above embodiments, but may be implemented as follows, for example. Note that components identical or equivalent to those in the above embodiments are denoted by the same reference signs, and the above descriptions of these components are incorporated herein.

The type of road marking may be included in road information instead of or together with the type of road sign. Road markings indicate regulations or instructions on road traffic, and include lines, marks, or characters drawn on road surfaces with road studs, paint, stones, and the like. The drive assist device 10 may determine the priority relation on the basis of the type of road marking. The drive assist device 10 may also determine the assist area on the basis of the type of road marking.

If the present road is identified as a non-priority road, the drive assist device 10 may execute assistance regardless of whether there is a vehicle detected.

In the above description, the drive assist device 10 detects a vehicle on the basis of captured images. Alternatively, a vehicle detection device that detects a vehicle may input detection information to the drive assist device 10, and the drive assist device 10 may detect a vehicle on the basis of the input detection information. The vehicle detection device can be, for example, a wide angle camera, a millimeter-wave radar, or a laser radar.

The drive assist device 10 may narrow down the range of detection of running vehicles on the basis of the traveling direction of the host vehicle. Specifically, the drive assist device 10 may narrow the range of detection of running vehicles down to the road area where a running vehicle is likely to approach the host vehicle. For example, when the host vehicle is about to turn right in a region with right-hand traffic, the drive assist device 10 may narrow the range of detection of running vehicles down to the left side of the vehicle. Information as to whether the host vehicle is in a region with right-hand traffic may be stored in advance in the storage unit 16, or may be acquired from a communication device such as a navigation system.

In the second embodiment, the type of road sign need not necessarily be included in road information as long as the road form is included. In this case, priority determination is performed in the priority determination process on the basis of the road form, not on the basis of the type of road sign.

The drive assist device 10 may determine the priority relation on the basis of road information irrespective of the presence or absence of a traffic light.

The drive assist device 10 may execute assistance in response to detecting an obstacle regardless of whether there is a running vehicle detected.

In a situation where the host vehicle is about to turn right or left to enter a lane of an intersecting road or where the host vehicle is about to cross a lane of an intersecting road, if no running vehicle approaching the host vehicle is detected in the lane, the drive assist device 10 need not execute drive assistance.

In the above description, the assist area is corrected in accordance with the presence or absence of a running vehicle or the traveling direction of the host vehicle. However, the assist area need not necessarily be corrected.

In the above description, the drive assist device 10 does not execute assistance when there is no vehicle detected. However, the drive assist device 10 may execute assistance. In this case, if a vehicle is detected, the drive assist device 10 may make the assist area different from the assist area to be used when there is no vehicle detected. For example, if a vehicle is detected, the drive assist device 10 may make the assist area broader than the assist area to be used when there is no vehicle detected.

The assistance pattern to be executed by the assist execution devices 23 may be changed on the basis of road information. For example, when the probability of collision is high, the speaker 23b may output a louder sound than when the probability of collision is low.

The present disclosure has been described with reference to examples, but it is to be understood that the present disclosure is not limited to the examples and structures. The present disclosure covers various modifications and equivalent variations. In addition to various combinations and forms, other combinations and forms including one or more/less elements thereof are also within the spirit and scope of the present disclosure.

The invention claimed is:

1. A drive assist device comprising:
an acquisition unit that acquires a captured image from an on-board camera;
a recognition unit that recognizes road information of roads around a host vehicle on the basis of the captured image;
a determination unit that determines, on the basis of the road information recognized by the recognition unit, a priority relation between a present road in which the host vehicle is running and an intersecting road that meets the present road;
an assist unit that executes, in response to the determination unit determining that the present road does not have priority over the intersecting road, drive assistance for the host vehicle when the host vehicle enters a place where the present road meets the intersecting road; and
an obstacle detection unit that detects, from the captured image, presence or absence of an obstacle that hinders capture of the intersecting road, wherein
the road information includes a road form of the place where the present road meets the intersecting road, and
in the presence of the obstacle that hinders capture of the intersecting road,
the assist unit executes the drive assistance in a second area different from a first area in which the assist unit executes the drive assistance in the absence of the obstacle, and
the assist unit makes corrections in a manner that expands the first area, and executes the drive assistance in the second area which is the corrected first area.

2. The drive assist device according to claim 1, wherein
in at least one of the place where the present road meets the intersecting road and its surrounding place, the assist unit determines an assist area in which the drive assistance is provided on the basis of the road information.

3. The drive assist device according to claim 1, wherein
the road information includes at least one of a type of road sign and a type of road marking.

4. The drive assist device according to claim 1, wherein
the road information includes the type of at least one of road sign and road marking and the road form of the place where the present road meets the intersecting road,
if the type of at least one of road sign and road marking is recognized, the determination unit determines the priority relation on the basis of the recognized type, and
if neither the type of road sign nor the type of road marking is recognized but the road form is recognized, the determination unit determines the priority relation on the basis of the road form.

5. The drive assist device according to claim 1,
wherein
in the presence of the obstacle, the assist unit executes the drive assistance in an area different from an area in which the assist unit executes the drive assistance in the absence of the obstacle.

6. The drive assist device according to claim 1, wherein
in accordance with a traveling direction in which the host vehicle enters the intersecting road, the assist unit determines an assist area in which the drive assistance is provided.

7. The drive assist device according to claim 1, wherein
the assist unit is capable of executing the drive assistance using a plurality of assist execution devices configured to be capable of executing the drive assistance in different ways, and
the assist unit executes the drive assistance with the assist execution device of a type that depends on the road information.

8. The drive assist device according to claim 1, comprising:
a traffic light determination unit that determines whether there is a traffic light in the place where the present road meets the intersecting road, wherein
in response to the traffic light determination unit determining that there is a traffic light, the assist unit restricts execution of the assistance.

9. The drive assist device according to claim 1, wherein
the assist unit executes control of a notification device that notifies a driver of the host vehicle that the present road does not have priority over the intersecting road.

10. The drive assist device according claim 9, wherein
the notification device is a monitor or a speaker.

11. The drive assist device according to claim 1, wherein
the assist unit makes corrections in the manner that expands the first area by a predetermined distance in a traveling direction of the host vehicle.

12. The drive assist device according to claim 1, wherein
the assist unit makes corrections in the manner that expands the first area when the host vehicle is traveling at high velocity than when the host vehicle is traveling at low velocity.

13. A drive assist device comprising:
an acquisition unit that acquires a captured image from an on-board camera;
a recognition unit that recognizes road information of roads around a host vehicle on the basis of the captured image;
a determination unit that determines, on the basis of the road information recognized by the recognition unit, a priority relation between a present road in which the host vehicle is running and an intersecting road that meets the present road;
an assist unit that executes, in response to the determination unit determining that the present road does not have priority over the intersecting road, drive assistance for the host vehicle when the host vehicle enters a place where the present road meets the intersecting road; and
a vehicle detection unit that detects presence or absence of a running vehicle in the intersecting road, wherein
in response to the vehicle detection unit detecting the running vehicle in the intersecting road, the assist unit executes the drive assistance in a fourth area different from a third area in which the assist unit executes the drive assistance in response to the vehicle detection unit detecting no running vehicle, and
the assist unit makes corrections in a manner that expands the third area, and executes the drive assistance in the fourth area which is the corrected third area.

14. The drive assist device according to claim 13, wherein
the vehicle detection unit detects a running vehicle in the intersecting road from the captured image.

15. The drive assist device according to claim 13, wherein
the assist unit makes corrections in the manner that expands the third area by a predetermined distance in a traveling direction of the host vehicle.

16. The drive assist device according to claim 13, wherein
the assist unit makes corrections in the manner that expands the third area when the host vehicle is traveling at high velocity than when the host vehicle is traveling at low velocity.

17. A drive assist device comprising:
an acquisition unit that acquires a captured image from an on-board camera;
a recognition unit that recognizes road information of roads around a host vehicle on the basis of the captured image;
a determination unit that determines, on the basis of the road information recognized by the recognition unit, a priority relation between a present road in which the host vehicle is running and an intersecting road that meets the present road;
an assist unit that executes, in response to the determination unit determining that the present road does not have priority over the intersecting road, drive assistance for the host vehicle when the host vehicle enters a place where the present road meets the intersecting road; and
a vehicle detection unit that detects presence or absence of a running vehicle in the intersecting road, a position of the running vehicle, and a traveling direction of the running vehicle, wherein
in a situation where the host vehicle is about to turn right or left to enter a lane of the intersecting road or where the host vehicle is about to cross a lane of the intersecting road, in response to the vehicle detection unit detecting a running vehicle in the lane approaching the host vehicle, the assist unit executes the drive assistance in a sixth area different from a fifth area in which the assist unit executes the drive assistance in response to the vehicle detection unit detecting no approaching vehicle, and
the assist unit makes corrections in a manner that expands the fifth area, and executes the drive assistance in the sixth area which is the corrected fifth area.

18. The drive assist device according to claim 17, wherein
in a situation where the host vehicle is about to turn right or left to enter the lane of the intersecting road, the assist unit makes corrections in the manner that expands the third area by a predetermined distance in a traveling direction of the host vehicle.

19. The drive assist device according to claim 17, wherein
in a situation where the host vehicle is about to cross the lane of the intersecting road, the assist unit makes corrections in the manner that expands the fifth area by a predetermined distance in a predetermined direction from a place where the present road meets the intersecting road.

20. The drive assist device according to claim 17, wherein
the assist unit makes corrections in the manner that expands the fifth area when the host vehicle is traveling at high velocity than when the host vehicle is traveling at low velocity.

21. A drive assist device mounted in a host vehicle including an on-board camera, a speaker, and a display device, the drive assist device comprising:
an acquisition unit that acquires a captured image from the on-board camera;
a recognition unit that recognizes road information of roads around the host vehicle on the basis of the captured image;
a determination unit that determines, on the basis of the road information recognized by the recognition unit, a priority relation between a present road in which the host vehicle is running and an intersecting road that meets the present road; and an assist unit that executes predetermined drive assistance using the speaker or the display device when the host vehicle enters a place where the present road meets the intersecting road in response to the determination unit determining that the present road does not have priority over the intersecting road, and does not execute the predetermined drive assistance using the speaker or the display device when the host vehicle enters the place where the present road meets the intersecting road in response to the determination unit determining that the present road has priority over the intersecting road, wherein the drive assist device is characterized by either:
(1) the road information includes a road form of the place where the present road meets the intersecting road; or
(2) a vehicle detection unit that detects presence or absence of a running vehicle in the intersecting road is further provided, and
  in response to the vehicle detection unit detecting the running vehicle in the intersecting road, the predetermined drive assistance is executed in a fourth area different from a third area in which the predetermined drive assistance is executed in response to the vehicle detection unit detecting no running vehicle, or
  a position of the running vehicle in the intersecting road and a traveling direction of the running vehicle are further detected by the vehicle detection unit, and in a situation where the host vehicle is about to turn right or left to enter a lane of the intersecting road or where the host vehicle is about to cross a lane of the intersecting road, in response to the vehicle detection unit detecting a running vehicle in the lane approaching the host vehicle, the predetermined drive assistance is executed in an area different from an area in which the predetermined drive assistance is executed in response to the vehicle detection unit detecting no approaching vehicle, and
the assist unit makes corrections in a manner that expands the third area, and executes the predetermined drive assistance in the fourth area which is the corrected third area.

22. A drive assist method that is applied to a host vehicle including an on-board camera, a speaker, and a display device, the drive assist method comprising:
acquiring a captured image from the on-board camera;
recognizing road information of roads around the host vehicle on the basis of the captured image;
determining, on the basis of the road information, a priority relation between a present road in which the host vehicle is running and an intersecting road that meets the present road; and
in response to determining that the present road does not have priority over the intersecting road, executing predetermined drive assistance using the speaker or the display device when the host vehicle enters a place where the present road meets the intersecting road; and
in response to determining that the present road has priority over the intersecting road, not executing the predetermined drive assistance using the speaker or the display device when the host vehicle enters the place where the present road meets the intersecting road, wherein the drive assist method is characterized by either:
(1) the road information includes a road form of the place where the present road meets the intersecting road; or
(2) presence or absence of a running vehicle in the intersecting road is detected, and
  in response to detecting the running vehicle in the intersecting road, the predetermined drive assistance is executed in a sixth area different from a fifth area in which the predetermined drive assistance is executed in response to detecting no running vehicle, or
  a position of the running vehicle in the intersecting road and a traveling direction of the running vehicle are further detected, and in a situation where the host vehicle is about to turn right or left to enter a lane of the intersecting road or where the host vehicle is about to cross a lane of the intersecting road, in response to detecting a running vehicle in the lane approaching the host vehicle, the predetermined drive assistance is executed in an area different from an area in which the predetermined drive assistance is executed in response to detecting no approaching vehicle, and
the assist unit makes corrections in a manner that expands the fifth area, and executes the predetermined drive assistance in the sixth area which is the corrected fifth area.

23. A drive assist device comprising:
a determination unit that determines, on the basis of road information of roads around a host vehicle, a priority relation between a present road in which the host vehicle is running and an intersecting road that meets the present road;
an assist unit that executes, in response to the determination unit determining that the present road does not have priority over the intersecting road, drive assistance for the host vehicle when the host vehicle enters a place where the present road meets the intersecting road;
an obstacle detection unit that detects, from the captured image, presence or absence of an obstacle that hinders capture of the intersecting road, wherein
the road information includes a road form of the place where the present road meets the intersecting road, and
in the presence of the obstacle that hinders capture of the intersecting road,
  the assist unit executes the drive assistance in a second area different from a first area in which the assist unit executes the dive assistance in the absence of the obstacle, and
  the assist unit makes corrections in a manner that expands the first area, and executes the drive assistance in the second area which is the corrected first area.

24. A drive assist device comprising:
a determination unit that determines, on the basis of road information of roads around a host vehicle, a priority relation between a present road in which the host vehicle is running and an intersecting road that meets the present road;
an assist unit that executes, in response to the determination unit determining that the present road does not have priority over the intersecting road, drive assistance for the host vehicle when the host vehicle enters a place where the present road meets the intersecting road; and a vehicle detection unit that detects presence or absence of a running vehicle in the intersecting road, wherein in response to the vehicle detection unit detecting the running vehicle in the intersecting road, the assist unit executes the dive assistance in a fourth area different from a third area in which the assist unit executes the drive assistance in response to the vehicle detection unit detecting no running vehicle, and the assist unit makes corrections in a manner that expands the third area, and executes the drive assistance fourth area which is the corrected third area.

25. A drive assist device comprising:

a determination unit that determines, on the basis of road information of roads around a host vehicle, a priority relation between a present road in which the host vehicle is running and an intersecting road that meets the present road;

an assist unit that executes, in response to the determination unit determining that the present road does not have priority over the intersecting road, drive assistance for the host vehicle when the host vehicle enters a place where the present road meets the intersecting road; and a vehicle detection unit that detects presence or absence of a running vehicle in the intersecting road, a position of the running vehicle, and a traveling direction of the running vehicle, wherein in a situation where the host vehicle is about to turn right or left to enter a lane of the intersecting road or where the host vehicle is about to cross a lane of the intersecting road, in response to the vehicle detection unit detecting a running vehicle in the lane approaching the host vehicle, the assist unit executes the drive assistance in a sixth area different from a fifth area in which the assist unit executes the drive assistance in response to the vehicle detection unit detecting no approaching vehicle, and the assist unit makes corrections in a manner that expands the fifth area, and executes the drive assistance in the sixth area which is the corrected fifth area.

* * * * *